US012803608B2

(12) United States Patent
Wang et al.

(10) Patent No.: US 12,803,608 B2
(45) Date of Patent: Nov. 17, 2026

(54) COMMUNICATION DEVICE AND VALID SIGNAL DETECTION METHOD

(71) Applicant: REALTEK SEMICONDUCTOR CORPORATION, Hsinchu (TW)

(72) Inventors: Li-Hua Wang, Suzhou (CN); Ran Zhang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 261 days.

(21) Appl. No.: 18/745,169

(22) Filed: Jun. 17, 2024

(65) Prior Publication Data

US 2025/0007550 A1 Jan. 2, 2025

(30) Foreign Application Priority Data

Jun. 27, 2023 (CN) ......................... 202310765487.1

(51) Int. Cl.

*H04B 1/16* (2006.01)
*H04B 1/10* (2006.01)
*H04L 27/26* (2006.01)

(52) U.S. Cl.

CPC ............. *H04B 1/16* (2013.01); *H04B 1/1027* (2013.01); *H04L 27/2662* (2013.01); *H04L 27/2692* (2013.01)

(58) Field of Classification Search

None

See application file for complete search history.

(56) References Cited

U.S. PATENT DOCUMENTS 11,477,066 B2 10/2022 Tseng
12,532,326 B2 * 1/2026 Hong .................. H04L 27/2636
(Continued)

FOREIGN PATENT DOCUMENTS

CN 101895491 A * 11/2010
CN 111654349 A * 9/2020 ............ H04J 3/0608
(Continued)

OTHER PUBLICATIONS

OA letter of a counterpart TW application (appl. No. 112129010) mailed on Mar. 29, 2024. Summary of the TW OA letter: 1. Claims 1-10 are rejected as allegedly being unpatentable over cited reference 1 (CN 101895491 A) in view of cited reference 2 (US 2013/0177112 A1). Correspondence bewteen claims of TW counterpart application and claims of US application: 1. Claims 1-10 in TW counterpart application correspond to claims 1-10 in US.

*Primary Examiner* — Mohammed Rachedine
(74) *Attorney, Agent, or Firm* — WPAT, PC

(57) ABSTRACT

A valid signal detection method includes the following operations: receiving, by a receiver circuitry, a communication signal, in which the communication signal includes a plurality of symbols; calculating a delay correlation function according to the plurality of symbols to determine whether the communication signal is valid; when the communication signal is determined to be valid according to at least one first symbol of the plurality of symbols, performing a first gain control according to at least one second symbol of the plurality of symbols to adjust a first gain of the receiver circuitry, in which the at least one second symbol follows the at least one first symbol; and when the communication signal is determined to be not valid according to the delay correlation function, stopping the first gain control and stopping processing the communication signal.

16 Claims, 3 Drawing Sheets

(56) References Cited

U.S. PATENT DOCUMENTS

| | | | |
|---|---|---|---|
| 2004/0137863 | A1 | 7/2004 | Walton |
| 2008/0165903 | A1 | 7/2008 | Hooli |
| 2010/0040044 | A1 | 2/2010 | Izumi |
| 2013/0177112 | A1 | 7/2013 | Lan |
| 2017/0078970 | A1 * | 3/2017 | Balakrishnan .... H04W 52/0229 |
| 2018/0224885 | A1 * | 8/2018 | Liang .................... H03L 7/0814 |
| 2022/0052765 | A1 * | 2/2022 | Torbatian ......... H04B 10/07951 |

FOREIGN PATENT DOCUMENTS

| | | | | |
|---|---|---|---|---|
| EP | 4096178 | A1 * | 11/2022 | ......... H04L 27/2691 |
| TW | I779247 | B | 10/2022 | |
| WO | WO-2013065466 | A1 * | 5/2013 | ......... H04L 27/2662 |

* cited by examiner

COMMUNICATION DEVICE AND VALID SIGNAL DETECTION METHOD

BACKGROUND OF THE INVENTION

1. Field of the Invention

The present disclosure relates to a communication device, especially to a communication device and a valid signal detection method thereof that are able to utilize a delay correlation to improve the speed of valid signal detection.

2. Description of Related Art

In practical applications, the communication signals received by communication systems are typically valid signals, interference, or a combination of both. In existing approaches, if a communication system is affected by interference and preliminarily misjudges this interference as a valid signal, the system must wait until the period of the start of frame delimiter to determine that the signal is interference, leading to a delay in receiving other valid signals. In some other approaches, communication systems may also use energy monitoring methods to distinguish between interference and valid signals. However, if the energy of the interference is close to that of the valid signal, the communication system may be unable to accurately differentiate between interference and valid signals.

SUMMARY OF THE INVENTION

In some aspects of the present disclosure, an object of the present disclosure is, but not limited to, provide a communication device and a valid signal detection method thereof that are able to utilize a delay correlation to improve the speed of valid signal detection, so as to make an improvement to the prior art.

In some aspects of the present disclosure, a communication device includes a receiver circuitry, a processor circuit, and a gain control circuitry. The receiver circuitry is configured to receive a communication signal, in which the communication signal comprises a plurality of symbols. The processor circuit is configured to calculate a delay correlation function according to the plurality of symbols to determine whether the communication signal is valid. The gain control circuitry is configured to be activated when the processor circuit determines that the communication signal is valid according to at least one first symbol of the plurality of symbols, to perform a first gain control according to at least one second symbol of the plurality of symbols to adjust a first gain of the receiver circuitry, in which the at least one second symbol follows the at least one first symbol, and when the processor circuit determines that the communication signal is not valid according to the delay correlation function, the processor circuit is configured to stop the first gain control and stop processing the communication signal.

In some aspects of the present disclosure, a valid signal detection method includes the following operations: receiving, by a receiver circuitry, a communication signal, in which the communication signal includes a plurality of symbols; calculating a delay correlation function according to the plurality of symbols to determine whether the communication signal is valid; when the communication signal is determined to be valid according to at least one first symbol of the plurality of symbols, performing a first gain control according to at least one second symbol of the plurality of symbols to adjust a first gain of the receiver circuitry, in which the at least one second symbol follows the at least one first symbol; and when the communication signal is determined to be not valid according to the delay correlation function, stopping the first gain control and stopping processing the communication signal.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
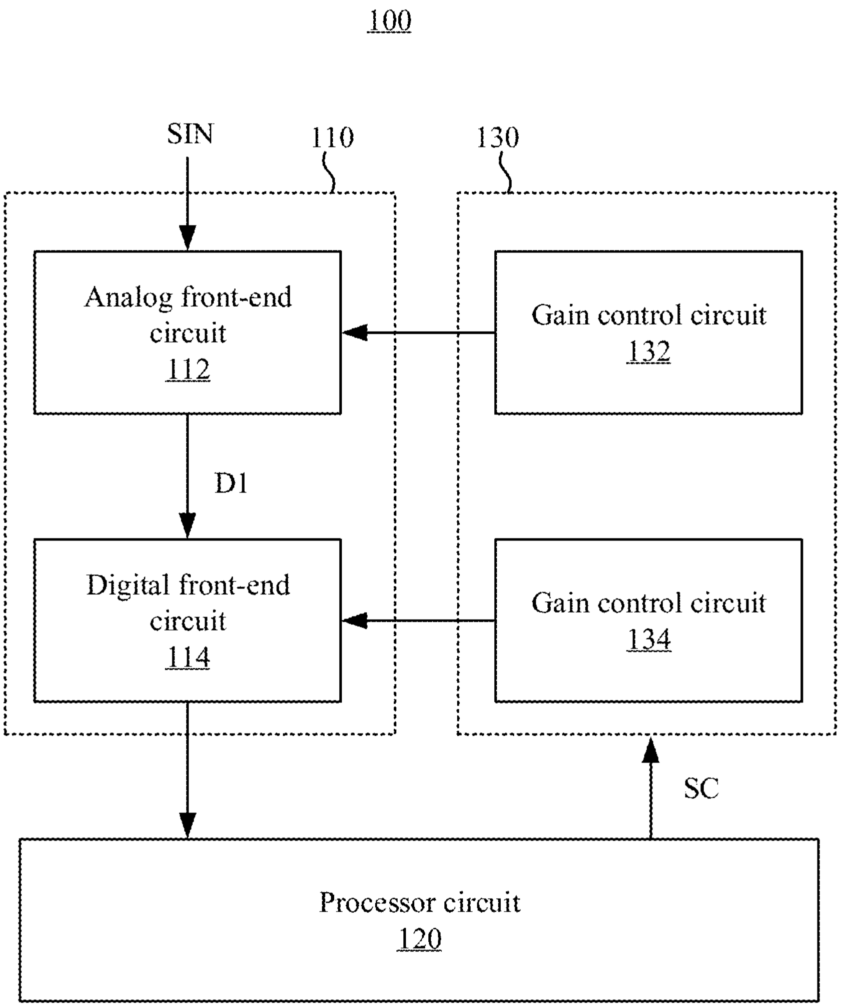
FIG. 1 illustrates a schematic diagram of a communication device according to some embodiments of the present disclosure.

FIG. 1 illustrates a schematic diagram of a communication device 100 according to some embodiments of the present disclosure. In some embodiments, the communication device 100 may be, but is not limited to, a wireless communication device. The communication device 100 includes a receiver circuitry 110, a processor circuit 120, and a gain control circuitry 130. The receiver circuitry 110 may receive a communication signal SIN and transmit the received communication signal SIN to the processor circuit

120 and the gain control circuitry 130. In greater detail, the receiver circuitry 110 includes an analog front-end circuit 112 and a digital front-end circuit 114. The analog front-end circuit 112 may process the communication signal SIN according to a first gain (e.g., an analog gain) to generate a digital signal D1. For example, the analog front-end circuit 112 may amplify the communication signal SIN based on the analog gain, filter the amplified communication signal, and convert the processed signal into the digital signal D1. For example, the analog front-end circuit 112 may include, but is not limited to, a low noise amplifier circuit (not shown) to provide the adjustable analog gain, a filter circuit (not shown), and an analog-to-digital converter circuit (not shown). The digital front-end circuit 114 is coupled to the analog front-end circuit 112 to receive the digital signal D1 and process the digital signal D1 according to a second gain (e.g., a digital gain) to obtain information carried in the communication signal SIN. In some embodiments, the digital front-end circuit 114 may include, but is not limited to, a digital filter circuit, a digital signal processor circuit, and so on.

The processor circuit 120 may perform (e.g., compute) a delay correlation function according to symbols in the communication signal SIN to determine whether the currently received communication signal SIN is valid. If the communication signal SIN is valid (e.g., if the communication signal SIN conforms to a packet format in a predetermined communication protocol), the processor circuit 120 may generate a control signal SC having a first logical value to notify the gain control circuitry 130 to start performing the aforementioned first gain control and second gain control. In some embodiments, the aforementioned predetermined communication protocol may be, but is not limited to, IEEE 802.15.4 or its related versions. If the communication signal SIN is a valid packet in this communication protocol, a preamble of the communication signal SIN has eight identical symbols. By using the delay correlation function to analyze these symbols, the processor circuit 120 may determine whether the currently received communication signal SIN is valid. If the results of the delay correlation function according to these symbols all lead the processor circuit 120 to determine the current communication signal SIN as valid, it indicates a high probability that the received communication signal SIN is valid. Alternatively, as noise or interference usually does not have the characteristic of repeated symbols, if the results of the delay correlation function based on these symbols do not lead the processor circuit 120 to determine the current communication signal SIN as valid, it indicates that the currently received communication signal SIN is not valid. Operations regarding herein are further explained in detail with reference to FIGS. 2 and 3.

The gain control circuitry 130 may start performing the first gain control and subsequently perform the second gain control based on the control signal SC outputted from the processor circuit 120, to adjust the analog gain and/or the digital gain of the receiver circuitry 110. For example, when the processor circuit 120 determines that the communication signal SIN is valid based on at least one first symbol of the communication signal SIN (which may be, for example, but not limited to, symbols P1-P3 in FIG. 3), the processor circuit 120 may output the control signal having a first logic value. In response to this control signal SC, the gain control circuitry 130 starts performing the first gain control. In other words, the gain control circuitry 130 may be activated when the processor circuit 120 determines that the communication signal SIN is valid according to the aforementioned at least one first symbol, in order to start performing the first gain control based on at least one second symbol of the communication signal SIN (which may be, for example, but not limited to, a symbol P4 in FIG. 3) to adjust the analog gain of the receiver circuitry 110 (e.g., the amplification gain of the analog front-end circuit 112), in which the at least one second symbol follows the aforementioned at least one first symbol. Afterwards, the gain control circuitry 130 may continue performing the second gain control based on at least one third symbol of the communication signal SIN (which may be, for example, but not limited to, symbols P5-P8 in FIG. 3) to adjust the digital gain of the receiver circuitry 110 (e.g., the amplification gain of the digital front-end circuit 114), in which the at least one third symbol follows the aforementioned at least one second symbol.

In some embodiments, the gain control circuitry 130 includes a gain control circuit 132 and a gain control circuit 134. The gain control circuit 132 is configured to perform the aforementioned first gain control, to adjust the analog gain of the receiver circuitry 110 (for example, it may adjust the circuit settings of amplifiers in the analog front-end circuit 112). In other words, the gain control circuit 132 may be an analog automatic gain control (AAGC) circuit. In some embodiments, the gain control circuit 132 may compare the signal strength of the currently received communication signal SIN with a first reference signal strength. If the signal strength of the currently received communication signal SIN is lower than the first reference signal strength, the gain control circuit 132 may increase the analog gain of the receiver circuitry 110. Alternatively, if the signal strength of the currently received communication signal SIN is higher than the first reference signal strength, the gain control circuit 132 may decrease the analog gain of the receiver circuitry 110. By repeating the aforementioned operations, the analog gain of the receiver circuitry 110 may be adaptively (timely) adjusted according to the signal strength of the received communication signal SIN, in order to achieve better signal quality. In some embodiments, the gain control circuit 132 may be implemented with a feedback control circuit able to perform the aforementioned operations.

The gain control circuit 134 is configured to perform the aforementioned second gain control, to adjust the digital gain of the receiver circuitry 110 (for example, it may adjust the circuit settings of the analog-to-digital converter in the analog front-end circuit 112, the circuit settings of the digital front-end circuit 114, and/or the related parameters in the signal processing algorithms). In other words, the gain control circuit 134 may be a digital automatic gain control (DAGC) circuit. In some embodiments, the gain control circuit 134 may compare the signal strength of the digital signal D1 with a second reference signal strength. If the signal strength of the digital signal D1 is lower than the second reference signal strength, the gain control circuit 134 may increase the digital gain of the receiver circuitry 110. Alternatively, if the signal strength of the digital signal D1 is higher than the second reference signal strength, the gain control circuit 134 may decrease the digital gain of the receiver circuitry 110. Thus, the gain control circuit 134 may maintain the signal strength of the digital signal D1 within a range suitable for subsequent signal processing. In some embodiments, the gain control circuit 134 may be implemented with a feedback control circuit able to perform the aforementioned operations.

In some embodiments, after activating the gain control circuitry 130 to perform the first gain control, the processor circuit 120 may continue calculating the delay correlation function based on symbols of the communication signal SIN to keep detecting whether the communication signal SIN is valid. In other words, during a progress of the gain control circuit 132 (and/or the gain control circuit 134) performing the first gain control (and/or the second gain control), the processor circuit 120 still continues calculating the delay correlation function to continue detecting whether the communication signal SIN is valid. If the communication signal SIN is detected to be invalid, it indicates that the received communication signal SIN might be noise or interference. Under this condition, the processor circuit 120 may output the control signal SC having a second logical value, in order to stop the first gain control (and/or the second gain control), and stop processing the communication signal SIN.

In some other embodiments, the communication device 100 includes a monitoring circuit (not shown), which continuously monitors the results produced by the processor circuit 120 based on the delay correlation function, and stops the first gain control (and/or the second gain control) and stops processing the communication signal SIN when the communication signal SIN is determined to be invalid. In some embodiments, the functionality of the aforementioned monitoring circuit may be integrated into the processor circuit 120, but the present disclosure is not limited thereto. In the aforementioned embodiments, the first gain control is AAGC, and the second gain control is DAGC, but the present disclosure is not limited thereto. In some other embodiments, the first gain control could be DAGC, and the second gain control could be AAGC.

Operations about the above mentioned AAGC and DAGC are given for illustration purposes, and the present disclosure is not limited thereto. Various gain control mechanisms able to adjust the analog and digital gains of the receiver circuit are within the contemplated scope of the present disclosure.

Figure 2:
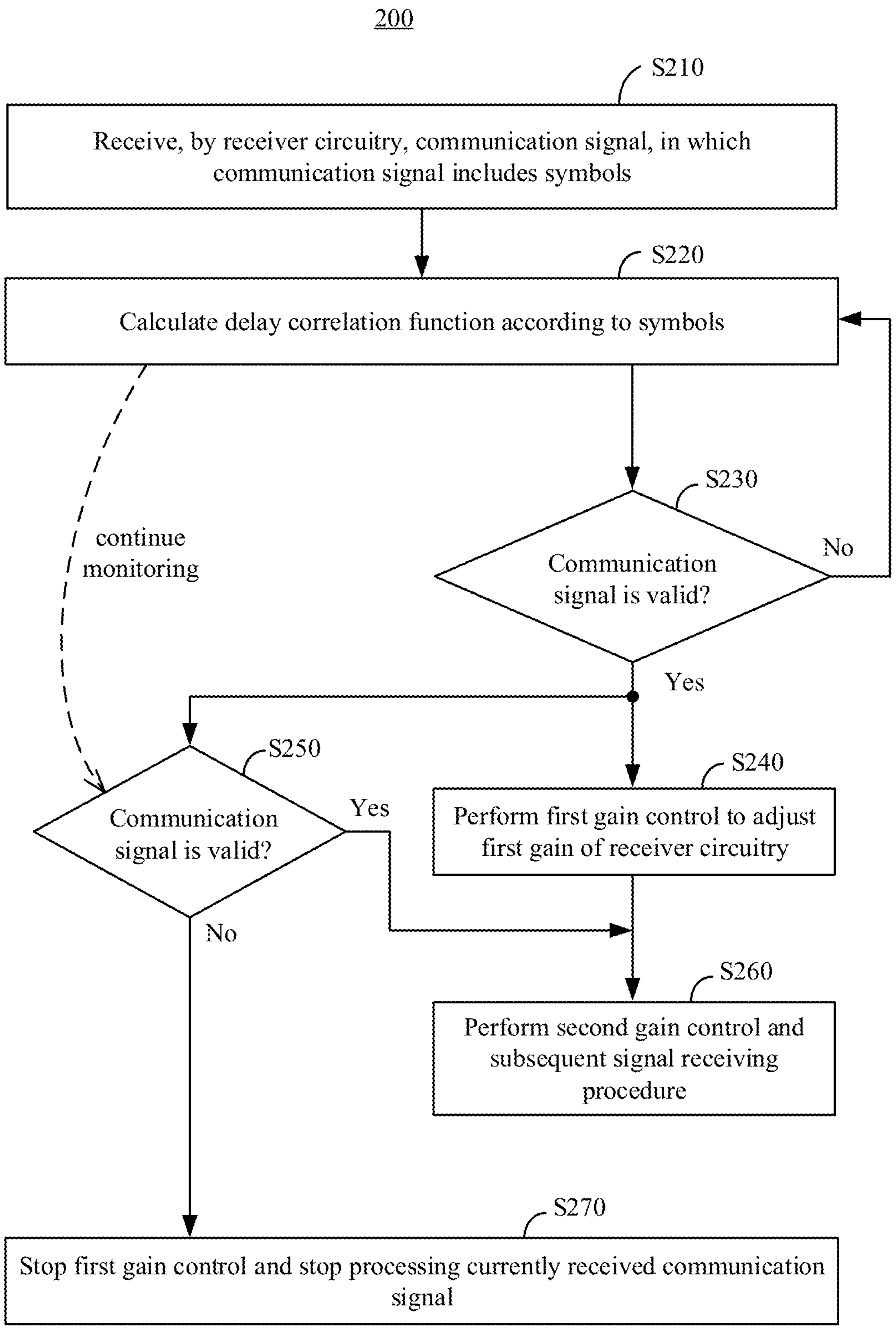
FIG. 2 illustrates a flowchart of a valid signal detection method according to some embodiments of the present disclosure.

FIG. 2 illustrates a flowchart of a valid signal detection method 200 according to some embodiments of the present disclosure. In some embodiments, operations of the valid signal detection method 200 may be performed by the communication device 100 of FIG. 1, but the present disclosure is not limited thereto.

In operation S210, the communication signal is received by the receiver circuitry, in which the communication signal includes multiple symbols. For example, the receiver circuitry 110 in FIG. 1 may receive the communication signal SIN.

In operation S220, a delay correlation function is calculated according to the symbols. In operation S230, whether the communication signal is valid is determined. If the communication signal is determined to be valid, operations S240 and S250 are performed. Alternatively, if the communication signal is determined to be not valid, operation S220 is performed again. For example, the processor circuit 120 may calculate the aforementioned delay correlation function based on the currently received symbols and determine whether the currently received symbols meet the relevant requirements of the predetermined communication protocol, to determine whether the currently received communication signal SIN is valid. If the currently received communication signal SIN is not valid, the processor circuit 120 will continue detecting whether the subsequent communication signal SIN received is valid (i.e., operation S220).

For ease of understanding operations S220 and S230, a mathematical model of a delay correlation function is described below (but the present disclosure is not limited thereto). In some embodiments, the delay correlation function may be represented by the following equation (1):

$$C(t) = \sum_{n=t}^{\tau+t-1} r_{i,n} \cdot r^{*}_{i,n-\tau} \tag{1}$$

where $r_{i,n}$ is the communication signal SIN received by the i-th antenna (not shown in FIG. 1) of the communication device 100 at the n-th time point, and t is a period of a preamble. In equation (1), the communication signal SIN is represented in a complex form with real and imaginary parts (i.e., $r_{i,n}$), which includes information about amplitude and phase of the signal. This is well understood by those skilled in the art, and thus further explanation is not given. Additionally, in equation (1), $$r^{*}_{i,n-\tau}$$

is the complex conjugate of $r_{i,n-\tau}$.

The processor circuit 120 may calculate the delay correlation function of the communication signal SIN according to at least one first symbol of the communication signal SIN (for example, at least one of the symbols of the communication signal SIN that are first received by the receiver circuitry 110) to determine delay correlation information (i.e., the calculation result of the delay correlation function). In some embodiments, the delay correlation information may include delay correlation output values and/or threshold values. In greater detail, the processor circuit 120 may obtain an output value C(t) based on the delay correlation function of equation (1), accumulate this output value C(t), and compute the square of the accumulated result to generate a delay correlation output value. The aforementioned operations may be expressed as the following equation (2):

$$O1 = \left(\sum_{t=0}^{L-1} C(t)\right)^2 \tag{2}$$

where O1 is the first delay correlation output value, and L is the time length. In some embodiments, the time length L may be set to be the period of the preamble symbol defined in the predetermined communication protocol that is employed by the communication device 100. For example, the aforementioned predetermined communication protocol may be IEEE 802.15.4 or its related versions. In this communication protocol, a preamble of a packet that meets the criteria for a valid signal includes 8 identical symbols, and each symbol has a period of 16 microseconds (μs). Under this condition, the time length L may be set to about 16 μs.

In some embodiments, the processor circuit 120 may obtain an output value C(t) based on the delay correlation function of equation (1), and accumulate the square of said output value C(t), and calculate the square of the accumulated result to generate a threshold value. The aforementioned operation may be expressed as the following equation (3):

$$TH1 = \sum_{t=0}^{L-1} C(t)^2 \tag{3}$$

where TH1 is the threshold value.

After the processor circuit 120 obtains the delay correlation output value O1 and the threshold value TH1 based on the delay correlation function calculated for at least one symbol, the processor circuit 120 may compare the delay correlation output value O1 and the threshold value TH1 to confirm whether the current communication signal SIN is valid. For example, if the delay correlation output value O1 is greater than the product of the threshold value TH1 and the time length L, the processor circuit 120 may determine that the current communication signal SIN is valid. Alternatively, if the delay correlation output value O1 is not greater than the threshold value TH1, the processor circuit 120 may determine that the current communication signal SIN is invalid.

With continued reference to FIG. 2, in operation S240, the first gain control is performed to adjust the first gain of the receiver circuitry. For example, as previously mentioned, when the processor circuit 120 detects that the current communication signal SIN is valid, the processor circuit 120 may output the control signal SC to activate the gain control circuitry 130 to start performing the first gain control according to the at least one second symbol of the communication signal SIN to adjust the analog gain of the receiver circuitry 110.

In operation S250, the result generated based on the delay correlation function is monitored to determine whether the communication signal is valid. If the communication signal SIN remains valid, operation S260 is performed. Alternatively, if the communication signal SIN is not valid, operation S270 is performed. In operation S260, the second gain control and subsequent signal receiving procedure(s) are performed. In operation S270, the first gain control is stopped and the processing of the currently received communication signal is stopped.

For example, during the interval of performing the first gain control by the gain control circuitry 130, the processor circuit 120 may continuously perform operations S210, S220, and S230, and continue monitoring the detection result generated in operation S230 (i.e., operation S250). Once the detection result generated in operation S230 indicates that the communication signal SIN is not valid, the processor circuit 120 may output the control signal SC to control the gain control circuitry 130 to stop the first gain control (and/or second gain control), and discard the currently received communication signal SIN to stop processing the currently received communication signal SIN. On the other hand, if the detection result generated in operation S230 continuously indicates that the communication signal SIN is valid, as previously mentioned, the gain control circuitry 130 may continue performing the second gain control according to the at least one third symbol of the communication signal SIN to adjust the digital gain of the receiver circuitry 110, and perform subsequent signal receiving procedure(s) (including, but not limited to, correction of carrier frequency offset, baseband signal processing, etc.).

The above operations of the valid signal detection method 200 include exemplary operations, but those operations are not necessarily performed in the order described above. Operations of the valid signal detection method 200 may be added, replaced, changed order, and/or eliminated, or the operations of the valid signal detection method 200 may be performed simultaneously or partially simultaneously as appropriate, in accordance with the spirit and scope of various embodiments of the present disclosure. For example, operation S240 and operation S250 may be simultaneously performed during the interval of the gain control circuitry 130 performing the first gain control.

Figure 3:
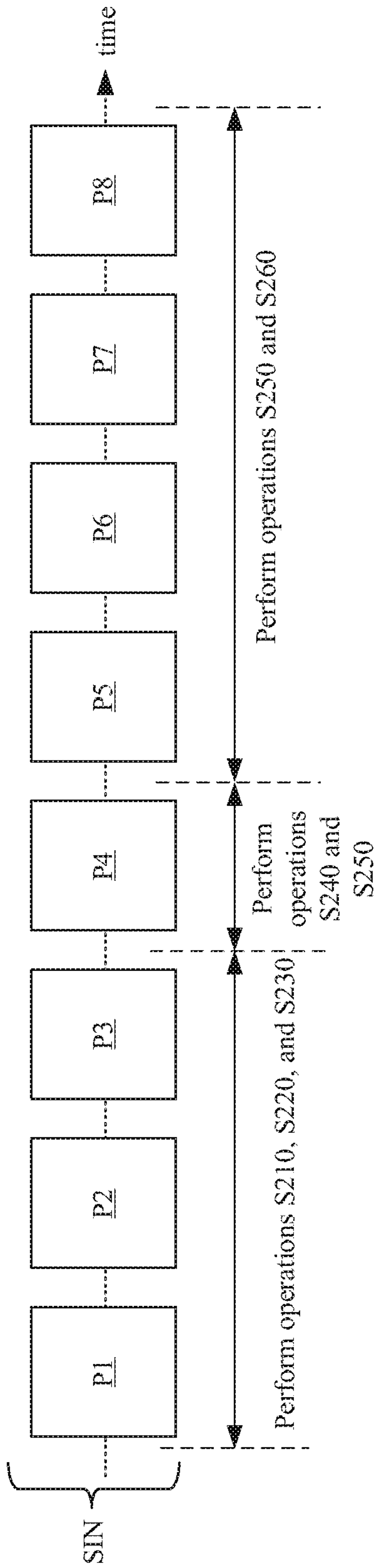
FIG. 3 illustrates a schematic diagram of the operation timing for the communication device of FIG. 1 according to some embodiments of the present disclosure.

FIG. 3 illustrates a schematic diagram of the operation timing for the communication device 100 of FIG. 1 according to some embodiments of the present disclosure. In this example, it is assumed that the predetermined communication protocol employed by the communication device 100 is IEEE 802.15.4, or its related versions. Therefore, if the communication signal SIN is valid, the packet format of the communication signal SIN should conform to the packet format defined in this predetermined communication protocol. For example, in the related specifications of IEEE 802.15.4, a valid packet sequentially includes a preamble, a start of frame delimiter, a frame length, and a physical layer service data unit (PSDU). FIG. 3 shows the preamble at the very beginning of the packet format, which includes 8 identical symbols P1-P8, each with a period of 16 μs.

As previously mentioned, the processor circuit 120 may determine whether the communication signal SIN is valid according to the at least one first symbol of the communication signal SIN, thereby activating the gain control circuitry 130. In some embodiments, the at least one first symbol may be at least one of the symbols of the communication signal SIN that is first received by the receiver circuitry 110. For example, as shown in FIG. 3, the processor circuit 120 may calculate the delay correlation function based on the symbols P1-P3 (which may be equivalent to the aforementioned at least one first symbol) to determine whether the communication signal SIN is valid (i.e., operations S210, S220, and S230 in FIG. 2). Then, if the communication signal SIN is determined to be valid, the gain control circuitry 130 may be activated and start performing the first gain control based on the symbol P4 (which may be equivalent to the aforementioned at least one second symbol) following the symbols P1-P3 (i.e., operation S240 in FIG. 2). Meanwhile, the processor circuit 120 may continue calculating the delay correlation function based on the subsequent symbols P5-P8 to continuously determine whether the communication signal SIN is valid (i.e., operation S250 in FIG. 2). The gain control circuitry 130 and/or the processor circuit 120 may continue performing the second gain control and subsequent signal receiving procedure(s) based on the remaining symbols P5-P8 (i.e., operation S260 in FIG. 2).

In some related approaches, when a communication device starts to receive a signal, if the symbol of the received signal meets the results obtained based on the delay correlation function (i.e., the communication device determines the currently received signal to be valid), the communication device will not perform the delay correlation function again. In these approaches, the communication device may only determine whether the signal is valid when receiving the start of frame delimiter of the signal (i.e., whether the previously obtained detection results based on the delay correlation function are correct is determined). In such approaches, if the currently received signal is actually noise or interference and the communication device mistakenly judges the received signal to be valid based on the delay correlation function, the communication device needs to wait until the reception of the start of frame delimiter (for example, after 8×16 μs) to perform a secondary check to determine that the signal is not valid. As a result, the communication devices in these approaches cannot immediately receive other valid signals during such checking period. Compared with those approaches, in some embodiments of the present disclosure, after performing the first gain control, the processor circuit 120 continues calculating the delay correlation function (and continues monitoring the result obtained based on the delay correlation function) to determine whether the communication signal SIN is valid. As the valid communication signal SIN has a long-duration repetition characteristic (i.e., 8 identical symbols P1-P8), the processor circuit 120 may continue calculating the delay correlation function according to the symbols P1-P8 during the preamble period to determine whether the communication signal SIN is valid. Thus, the communication device 100 may perform several detections before receiving the start of frame delimiter to avoid misjudgment, and accordingly discard the current communication signal SIN (if the communication signal SIN is detected to be invalid) to more quickly start receiving the next communication signal SIN. Meanwhile, the gain control circuitry 130 may perform original operations during the detection period of the processor circuit 120, and thus the aforementioned valid signal detection does not affect the operation efficiency of other circuits in the communication device 100.

The correspondence among the symbols P1-P8 shown in FIG. 3 and the aforementioned at least one first symbol, at least one second symbol, and at least one third symbol is not limited to the above examples. It is understood that, in different embodiments, the number of symbols in at least one first symbol may be one or more of the symbols P1-P8, the number of symbols in at least one second symbol may be one or more of the symbols P1-P8, and the number of symbols in at least one third symbol may be one or more of the symbols P1-P8. In other words, in different embodiments, the at least one first symbol, the at least one second symbol, and the at least one third symbol may be the same, partially the same, or completely different (e.g., embodiments shown in FIG. 3). In some embodiments, there may be other symbols between the at least one second symbol and the at least one first symbol, and there may be other symbols between the at least one third symbol and the at least one second symbol. In other words, in different embodiments, the at least one second symbol may directly or indirectly follow the at least one first symbol, and the at least one third symbol may directly or indirectly follow the at least one second symbol. In some embodiments, the period of performing the valid signal detection method 200 may be a portion of the preamble period. In some embodiments, the period of performing the valid signal detection method 200 may be the same as the preamble period. In other words, the communication device 100 may perform the aforementioned valid signal detection method 200 based on a part of the symbols P1-P8, or perform the aforementioned valid signal detection method 200 based on all of the symbols P1-P8.

The mathematical models of the delay correlation functions, the delay correlation output values O1, and the threshold values TH1 provided in the aforementioned embodiments are for illustrative purposes only, and the present disclosure is not limited thereto. In some embodiments, additional parameters such as antenna weight parameters and threshold value correction parameters may be incorporated into the delay correlation function. Various delay correlation functions and delay correlation information for signal detection are within the contemplated scope of the present disclosure.

On the other hand, the packet formats and types of predetermined communication protocols provided in the aforementioned embodiments are given for illustrative purposes, and the present disclosure is not limited thereto. Various predetermined communication protocols that transmit packets with repetitive (long or certain duration) characteristics are within contemplated the scope of the present disclosure. For example, in some embodiments, the predetermined communication protocol may also include versions of IEEE 802.11.

As described above, the communication devices and the valid signal detection method provided in some embodiments of the present disclosure may utilize the delay correlation function to continuously monitor whether the currently received communication signal is interference, thereby more quickly discarding invalid signals and starting to receive new signals.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A communication device, comprising:

a receiver circuitry configured to receive a communication signal, wherein the communication signal comprises a plurality of symbols;

a processor circuit configured to calculate a delay correlation function according to the plurality of symbols to determine whether the communication signal is valid; and a gain control circuitry configured to be activated when the processor circuit determines that the communication signal is valid according to at least one first symbol of the plurality of symbols, to perform a first gain control according to at least one second symbol of the plurality of symbols to adjust a first gain of the receiver circuitry, wherein the at least one second symbol follows the at least one first symbol, and when the processor circuit determines that the communication signal is not valid according to the delay correlation function, the processor circuit is configured to stop the first gain control and stop processing the communication signal, wherein, after the gain control circuitry starts performing the first gain control, the processor circuit is configured to continue calculating the delay correlation function to determine whether the communication signal is valid.

2. The communication device of claim 1, wherein the receiver circuitry comprises:

an analog front-end circuit configured to receive the communication signal and process the communication signal according to the first gain to generate a digital signal; and a digital front-end circuit configured to process the digital signal according to a second gain.

3. The communication device of claim 2, wherein the gain control circuitry is further configured to perform a second gain control to adjust the second gain according to at least one third symbol of the plurality of symbols, and the at least one third symbol follows the at least one second symbol.

4. The communication device of claim 3, wherein when the processor circuit determines that the communication signal is not valid according to the delay correlation function, the processor circuit stops the second gain control and stops processing the communication signal.

5. The communication device of claim 3, wherein the first gain control is an analog gain control, and the second gain control is a digital gain control.

6. The communication device of claim 1, wherein the at least one first symbol is at least one of the plurality of symbols that is first received by the receiver circuitry.

7. The communication device of claim 1, wherein the plurality of symbols are comprised in a preamble, and the preamble conforms to a communication protocol IEEE 802.15.4.

8. The communication device of claim 1, wherein the plurality of symbols are identical to each other.

9. A valid signal detection method, comprising:

receiving, by a receiver circuitry, a communication signal, wherein the communication signal comprises a plurality of symbols;

calculating a delay correlation function according to the plurality of symbols to determine whether the communication signal is valid;

when the communication signal is determined to be valid according to at least one first symbol of the plurality of symbols, performing a first gain control according to at least one second symbol of the plurality of symbols to adjust a first gain of the receiver circuitry, wherein the at least one second symbol follows the at least one first symbol; and when the communication signal is determined to be not valid according to the delay correlation function, stopping the first gain control and stopping processing the communication signal, wherein when the communication signal is determined to be not valid according to the delay correlation function, stopping the first gain control and stopping processing the communication signal comprises:

after the first gain control is started, continuing to calculate the delay correlation function to determine whether the communication signal is valid; and when the communication signal is determined to be not valid, stopping the first gain control and stopping processing the communication signal.

10. The valid signal detection method of claim 9, wherein receiving, by the receiver circuitry, the communication signal comprises:

processing, by an analog front-end circuit of the receiver circuitry, the communication signal according to the first gain to generate a digital signal; and processing, by a digital front-end circuit of the receiver circuitry, the digital signal according to a second gain.

11. The valid signal detection method of claim 10, further comprising:

performing a second gain control to adjust the second gain according to at least one third symbol of the plurality of symbols, wherein the at least one third symbol follows the at least one second symbol.

12. The valid signal detection method of claim 11, further comprising:

when the communication signal is determined to be not valid according to the delay correlation function, stopping the second gain control and stopping processing the communication signal.

13. The valid signal detection method of claim 11, wherein the first gain control is an analog gain control, and the second gain control is a digital gain control.

14. The valid signal detection method of claim 9, wherein the plurality of symbols are identical to each other.

15. The valid signal detection method of claim 9, wherein the plurality of symbols are comprised in a preamble, and the preamble conforms to a communication protocol IEEE 802.15.4.

16. The valid signal detection method of claim 9, wherein the at least one first symbol is at least one of the plurality of symbols that is first received by the receiver circuitry.

* * * * *